(12) United States Patent
Goel

(10) Patent No.: US 11,370,269 B2
(45) Date of Patent: Jun. 28, 2022

(54) METHOD FOR DETERMINING RECIRCULATION MODE IN VEHICLES

(71) Applicant: Sarang Goel, Irving, TX (US)

(72) Inventor: Sarang Goel, Irving, TX (US)

(*) Notice: Subject to any disclaimer, the term of this patent is extended or adjusted under 35 U.S.C. 154(b) by 348 days.

(21) Appl. No.: 16/840,355

(22) Filed: Apr. 4, 2020

(65) Prior Publication Data
US 2021/0309073 A1 Oct. 7, 2021

(51) Int. Cl.
*B60H 1/00* (2006.01)
(52) U.S. Cl.
CPC ......... *B60H 1/00771* (2013.01); *B60H 1/008* (2013.01); *B60H 1/00742* (2013.01); *B60H 1/00849* (2013.01)
(58) Field of Classification Search
CPC ............ B60H 1/00742; B60H 1/00771; B60H 1/008; B60H 1/00849
USPC .......................................................... 454/75
See application file for complete search history.

(56) References Cited

U.S. PATENT DOCUMENTS 10,183,552 B2 1/2019 Zulkowski
10,226,982 B2 3/2019 Alger et al.
2015/0105976 A1* 4/2015 Shikii ................ B60H 1/00742
701/36
2016/0318368 A1* 11/2016 Alger ............... G08G 1/096725

* cited by examiner

Primary Examiner — Ko-Wei Lin

(57) ABSTRACT

Automotive Heating, Ventilation, and Air Conditioning system includes a recirculation mode to control movement of cabin air in vehicle. Air is recirculated within the vehicle cabin space when the vehicle recirculation mode is on. Air is drawn from outside when the recirculation mode is turned off. Because of the buildup of carbon dioxide (CO2) inside the vehicle, the vehicle needs regular ventilation to maintain low CO2 levels in the vehicle cabin space. A method is described for determining and communicating recirculation mode in a vehicle for improving cabin air quality. The method comprises of capturing an image or video of the traffic ahead of the vehicle using a dashboard or windshield mounted smartphone camera or a vehicle camera, followed by analyzing the image or video of traffic to determine traffic condition as the weighted sum of the sizes of vehicles detected in traffic. The method further comprises of acquiring the number of vehicle occupants and vehicle speed, determining outside air acceptability state based on the traffic condition and the vehicle speed, determining carbon dioxide (CO2) levels in the vehicle cabin space based on the number of vehicle occupants present, determining the final recirculation mode based on the outside air acceptability state and the CO2 levels in the vehicle cabin space, and communicating the final recirculation mode to the vehicle controller or vehicle occupant.

20 Claims, 6 Drawing Sheets

| Traffic Condition (Weighted Sum of Box Height for Vehicles) 402 | | Vehicle Speed (MPH) 404 | | |
|---|---|---|---|---|
| | | Low (<10) 412 | Medium (10 - 45) 414 | High (>45) 416 |
| | Low (<1) 406 | Not Acceptable | Acceptable 420 | Acceptable |
| | Medium (1 - 3) 408 | Not Acceptable | Maybe Acceptable 422 | Acceptable |
| | High (>3) 410 | Not Acceptable | Not Acceptable 424 | Maybe Acceptable |

METHOD FOR DETERMINING RECIRCULATION MODE IN VEHICLES

TECHNICAL FIELD

The present disclosure relates generally to an automotive heating, ventilation and air conditioning (HVAC) system having a recirculation mode to operate an inlet air control valve. In certain embodiments, the present disclosure relates to a sensor-less method of operating the recirculation mode.

BACKGROUND

Automotive Ventilation and Air Quality systems are used to regulate environmental pollutants within the enclosed space of a vehicle. Air is recirculated within the vehicle cabin space when the vehicle recirculation mode is on. Air is drawn from outside when the recirculation mode is turned off. Vehicle HVAC systems commonly include an inlet air controller such as a movable valve or shutter (referred to herein simply as an inlet air valve) that is positioned to control the inlet air drawn from inside the vehicle cabin or from outside the vehicle cabin. Cabin air recirculation may be used to limit the intrusion of polluted air when driving in congested traffic, and full outside air may be used to purge the cabin of smoke or odors. However, the average driver frequently fails to manually position the inlet air valve as recommended, and sometimes polluted air has already entered the cabin by the time the driver switches to cabin air recirculation. For these reasons, the trend is to equip vehicle HVAC systems with one or more air quality sensors, and the inlet air valve is automatically positioned based on the air quality sensor either inside or outside or both to minimize the amount of polluted air entering the inlet air stream.

Such systems are not common in use as they are expensive and require frequent calibration. A problem that occurs with automated positioning of the inlet air valve based on air quality sensing is that the HVAC may stay in recirculation mode for extended time resulting in high $CO_2$ levels in cabin space. High $CO_2$ levels may cause sleepiness and thus is a safety concern. To overcome this situation, some automotive manufacturers automatically open the air inlet valve to bring in outside air after a preset maximum recirculation period. This also is unreliable as the $CO_2$ buildup in vehicle is dependent on number of vehicle occupants present. Adding another sensor to measure $CO_2$ levels in the cabin space is a way of overcoming this situation. However, the air quality sensing system becomes very costly to the customer this limiting the use.

Accordingly, what is needed is a sensor-less method of operating the air inlet valve in response to detected traffic condition outside and estimated level of $CO_2$ in cabin space that provides the improved cabin air quality automatically or via occupant participation.

SUMMARY OF THE DISCLOSURE

A vehicle heating, ventilation and air conditioning (HVAC) system includes an inlet air control valve. A camera or a combination of cameras are positioned and configured to take image or video of the traffic condition ahead of the vehicle, and a controller is communicatively coupled to the camera. The controller determines, based on the analysis of the image or video, that the traffic condition is either acceptable, maybe acceptable, or not acceptable.

The present invention is directed to a sensor-less method controlling an inlet air valve in a vehicle HVAC system which does not include an air quality sensor in an outside air inlet passage or inside vehicle cabin, wherein the air inlet valve is immediately closed to provide cabin air recirculation when the sensor-less method detects the presence of polluted air outside because of heavy traffic and is thereafter re-opened after a determined period of time based on the estimated level of $CO_2$ in cabin space and when the outside air is no longer polluted. In a preferred embodiment, outside traffic condition quantifies the pollution level of the inlet air, and the opening of the air inlet valve is determined based on the determination of $CO_2$ level in cabin space.

BRIEF DESCRIPTION OF THE DRAWINGS

For a more complete understanding of the present disclosure, reference is now made to the following description, taken in conjunction with the accompanying drawings, in which:

FIG. 4 is a chart illustrating an example method of determining outside air acceptability as a function of traffic condition and vehicle speed;

DETAILED DESCRIPTION

In the following detailed description, numerous specific details are set forth to provide a thorough understanding of the described exemplary embodiments. It will be apparent, however, to one skilled in the art that the described embodiments can be practiced without some or all of these specific details. In other exemplary embodiments, well known structures or process steps have not been described in detail in order to avoid unnecessarily obscuring the concept of the present invention.

Figure 1:
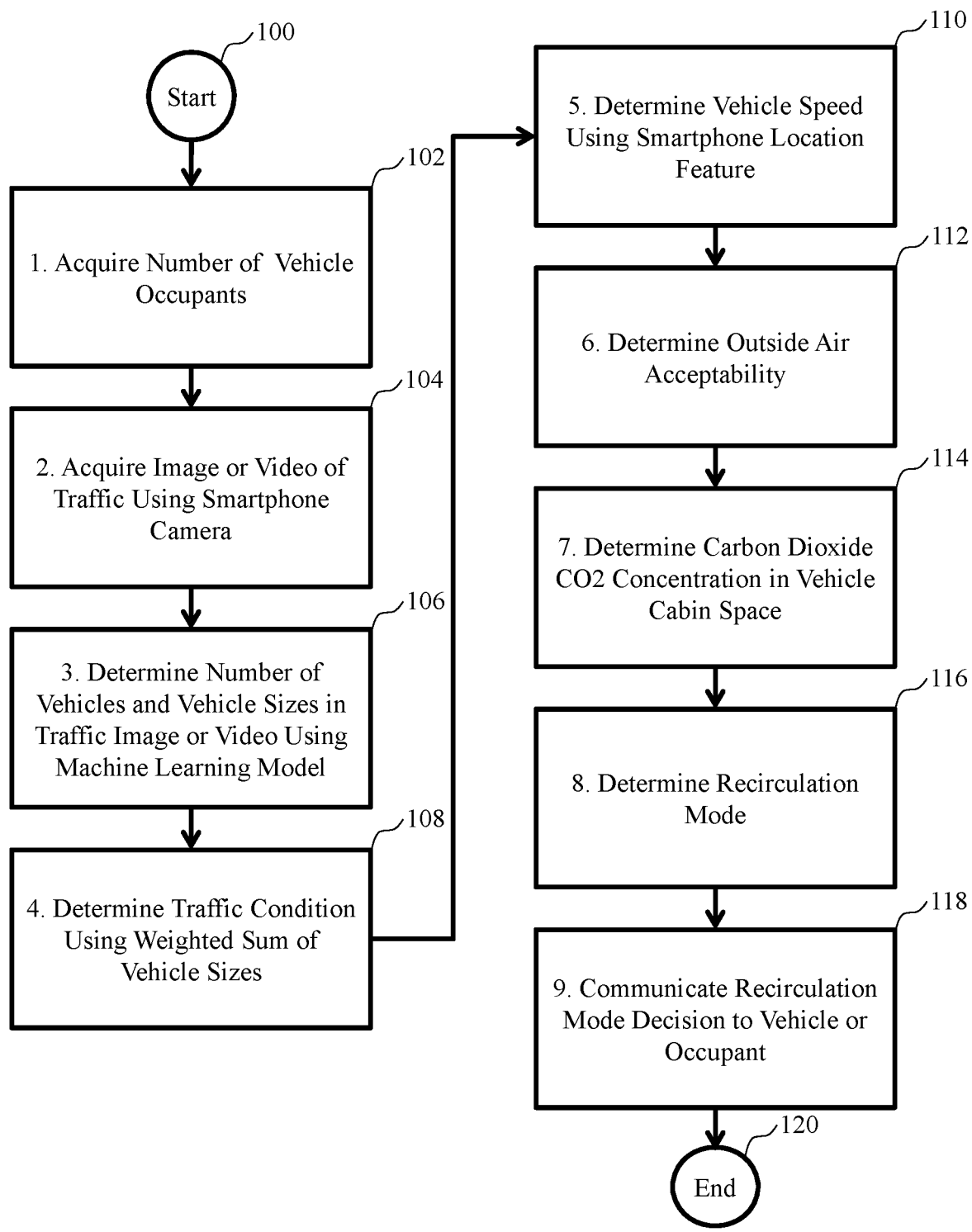
FIG. 1 illustrates a flow chart showing a method for determining recirculation mode in a vehicle in accordance with an exemplary embodiment of the present invention.

Referring first to FIG. 1, there is shown a flow chart of a method for determining recirculation mode in a vehicle in accordance with an exemplary embodiment of the present invention. The method starts at step 100. After step 100, the method proceeds to step 102.

According to one embodiment of the present invention, a smartphone with a back camera is mounted on the dashboard or the windshield of a vehicle so as to be able to take images or videos of the traffic ahead of the vehicle. At step 102, the number of occupants in the vehicle is acquired. The information may be entered by the vehicle occupant into an App of the smartphone with the back camera. According to another embodiment of the present invention, the information may be entered by the vehicle occupant into a vehicle controller. According to yet another embodiment of the present invention, front camera of the dashboard or windshield mounted smartphone may automatically detect and capture the number of occupants present in the vehicle. According to yet another embodiment of the present invention, the vehicle could detect the number of vehicle occupants present using pressure sensors located under each seat of the vehicle and send this value to the smartphone or the vehicle controller. The above-mentioned methods for acquiring the number of occupants in the vehicle are only examples. Those skilled in the art would appreciate other suitable methods of acquiring the information according to the teaching of the present invention.

After step 102, the method proceeds to step 104. At step 104, image or video of the traffic ahead of the vehicle is acquired. There are various sources from which the image or the video may be acquired. According to one embodiment of the present invention, the back camera of the smartphone mounted on the dashboard or the wind-shield of the vehicle may acquire image or video of the traffic ahead of the vehicle.

According to another embodiment of the present invention, the camera of the vehicle may acquire image or video of the traffic ahead of the vehicle. According to yet another embodiment of the present invention, a webcam mounted on the dashboard or the wind-shield of the vehicle may acquire image or video of the traffic ahead of the vehicle.

After step 104, the method proceeds to step 106. At step 106, image or video acquired in step 104 is analyzed for presence of vehicles. Furthermore, for each vehicle detected in the image or the video, the size of the vehicle is determined. According to one embodiment of the present invention, a machine learning model is employed real-time in conducting the above-mentioned analysis of the image or the video. For example, a Support Vector Machines (SVM) classifier may be used by the smartphone app in order to detect vehicles in the image of traffic. The classifier may use color space, spatial binning, and histogram of oriented gradients (HOG) methods to aid in vehicle detection. The classifier maybe supported by the Linear Support Vector Classifier (SVC), an algorithm that is used for pattern analysis. Through training image datasets, the algorithm may be trained to recognize vehicle features in the image. Likewise, the algorithm may also be trained to ignore non-vehicle features in the image. With large vehicle and non-vehicle datasets such as the KITTI Vision and GTI, the classifier may be trained to detect vehicles in images. After the classifier is trained, the model may be saved to be used in the smartphone app in order to avoid the training and testing process in the future.

After step 106, the method proceeds to step 108. At step 108, a traffic condition is determined based on the number of vehicles and vehicle sizes detected in step 106. According to one embodiment of the present invention, the traffic condition is determined as the sum of the sizes of the vehicles. According to another embodiment of the present invention, the traffic condition is determined as the weighted sum of the sizes of the vehicles, where the nearest vehicle is assigned the most weight and the farthest vehicle is assigned the least weight.

After step 108, the method proceeds to step 110. At step 110, a vehicle speed is determined. There are various sources from which the vehicle speed may be acquired. According to one embodiment of the present invention, the vehicle speed may be determined by the smartphone app using the smartphone location feature.

According to another embodiment of the present invention, the vehicle speed may be acquired by the controller of the vehicle. According to yet another embodiment of the present invention, the vehicle controller may communicate the vehicle speed to the smartphone.

After step 110, the method proceeds to step 112. At step 112, an outside air acceptability state is determined. According to one embodiment of the present invention, the outside air acceptability state is determined based on the traffic condition determined in step 108 and the vehicle speed determined in step 110. Because of the buildup of carbon dioxide (CO2) levels inside the vehicle, the vehicle needs regular ventilation to maintain low CO2 levels in the vehicle cabin space. However, before ventilation can occur, determining the outside air acceptability state is necessary. For good health of vehicle occupants, it is important not to bring in outside air for ventilation when the outside air is full of traffic-related pollutants. The outside air acceptability state may be in the range of acceptable, maybe acceptable, or not acceptable. Acceptable range refers to having clean outside air while unacceptable range refers to having polluted outside air. Maybe acceptable range refers to a condition of outside air that may or may not be acceptable and is further dependent on other factors such as vehicle speed or CO2 levels inside the vehicle cabin space.

After step 112, the method proceeds to step 114. At step 114, a carbon dioxide (CO2) gas concentration in the cabin space of the vehicle is determined. When the recirculation mode is turned on, the air in the cabin of the vehicle is recirculated without bringing any fresh air from outside. Due to breathing, the vehicle occupants are constantly exhaling carbon dioxide resulting in continuous rise in CO2 concentration. According to one embodiment of the present invention, the carbon dioxide concentration in the vehicle cabin space can be determined based on the number of vehicle occupants, typical CO2 exhalation rate per person, and typical CO2 ventilation rate during ventilation of vehicle. In general, the more the number of vehicle occupants, and the longer the duration of the recirculation mode, the higher is the CO2 concentration in the cabin space of the vehicle. Excessive buildup of CO2 concentration in the cabin space of the vehicle causes sleepiness and nausea resulting in unsafe driving conditions.

After step 114, the method proceeds to step 116. At step 116, a recirculation mode for the vehicle is determined based on the outside air acceptability state determined in step 112 and the carbon dioxide concentration in vehicle cabin space determined in step 114. When recirculation mode is turned ON, cabin air is recirculated to prevent traffic-related pollutants from entering the vehicle, and when recirculation mode is turned OFF, outside air is brought into the cabin space for lowering CO2 concentration to healthy levels.

After step 116, the method proceeds to step 118. At step 118, the recirculation mode determined in step 116 is communicated to the vehicle controller or the vehicle occupant. According to one embodiment of the present invention, the recirculation mode is communicated via Bluetooth to the vehicle controller. The vehicle controller then operates the recirculation mode accordingly. According to another embodiment of the present invention, the recirculation mode is communicated to the vehicle occupant via an audio announcement of the smartphone app or the vehicle audio system. According to yet another embodiment of the present invention, the recirculation mode is further displayed on the screen of the smartphone app or on the vehicle screen.

Finally, the method ends at step 120. In general, the recirculation mode is determined continuously based on the changing states described in the method. According to one embodiment of the present invention, the recirculation mode is communicated only when there is a change in the recirculation mode from the previous determination of the method. According to one embodiment of the present invention, the method is implemented in the smartphone app. According to another embodiment of the present invention, the method is implemented in the vehicle controller. The above mentioned methods are only examples. Those skilled in the art would appreciate other suitable methods according to the teaching of the present invention.

According to an embodiment of the present invention, the air quality in the cabin space of the vehicle can be improved by utilizing the state information about the vehicle and/or environmental information of the vehicle, and thus providing long-term health benefits for vehicle occupants.

Hereinafter, the method according to the present invention will be described with many specific details in combination with FIGS. 2-6. Again, such specific details are given by way of example, and the present invention may be practiced without some or all of the details.

Figure 2A:
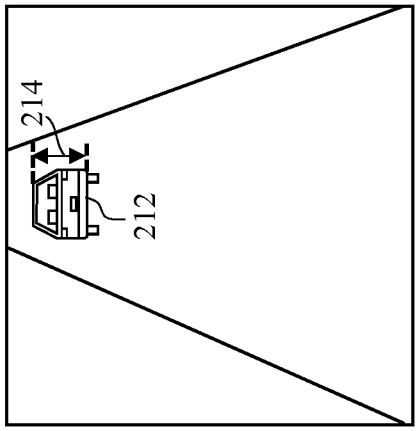
FIGS. 2A-2D illustrate examples of vehicle size in traffic images taken by a camera system.
Figure 2B:
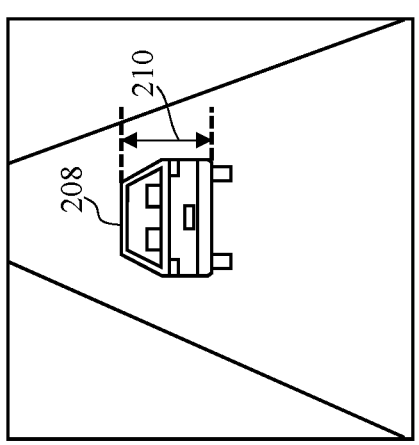
Figure 2C:
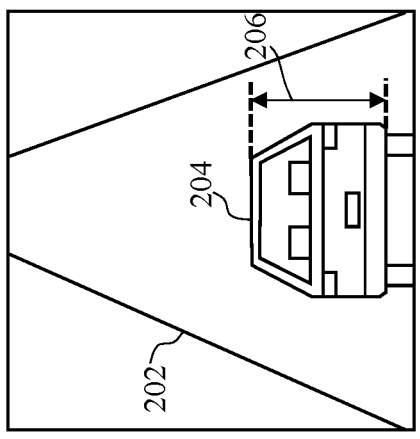
Figure 2D:
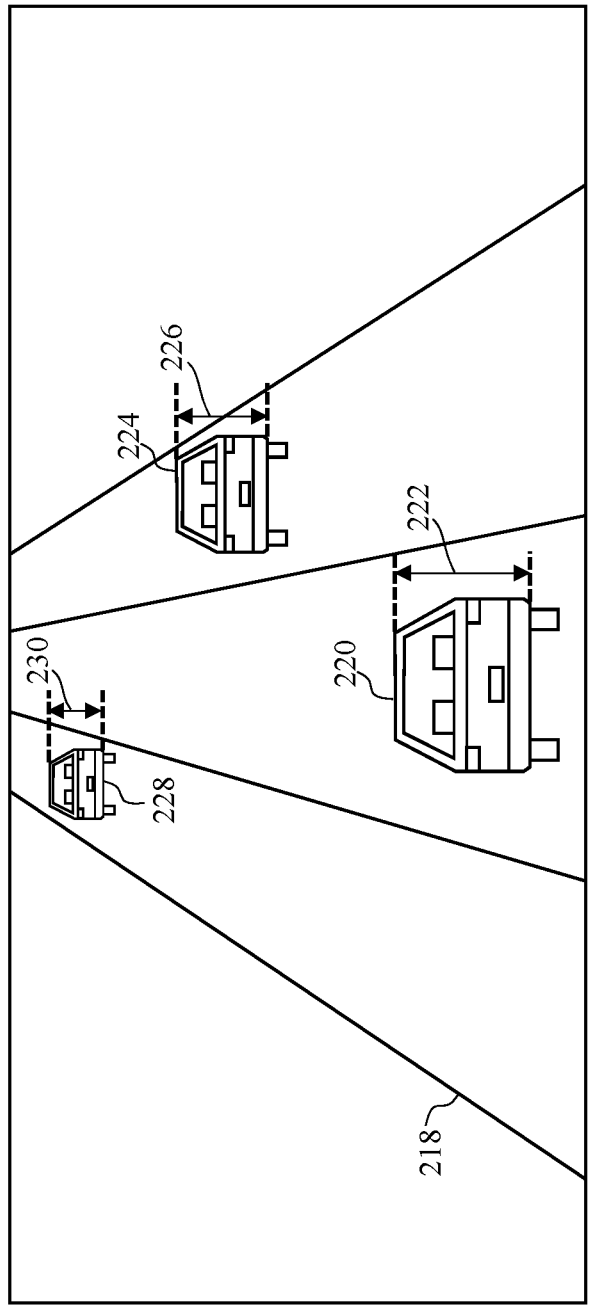

An example of determining vehicle size as described in step 106 of FIG. 1 is illustrated in FIGS. 2A-2D. FIG. 2A illustrates a single lane road 202 and a near vehicle 204 of size 206 in traffic as seen, ahead of the vehicle with the dashboard or windshield mounted smartphone camera. The near vehicle appears large in the traffic image acquired by the smartphone camera. FIG. 2B illustrates vehicle 208 that is farther away in traffic from the vehicle with the smartphone camera, and the size 210 of the vehicle 208 is clearly smaller than the size 206 of the vehicle 204. Similarly, FIG. 2C illustrates vehicle 212 that is much farther away in traffic from the vehicle with the smartphone camera, and the size 214 of the vehicle 212 is clearly smaller than the size 210 of the vehicle 208. FIGS. 2A-2C clearly illustrates that farther the vehicle in traffic is from the vehicle with the smartphone camera, the smaller it appears in the traffic image acquired by the back camera of the smartphone. FIG. 2D illustrates a three-lane road 218 with three vehicles 220, 224, and 228 with respective sizes 222, 226, and 230, as seen ahead of the vehicle with the back camera of a dashboard or windshield mounted smartphone.

Figure 3:
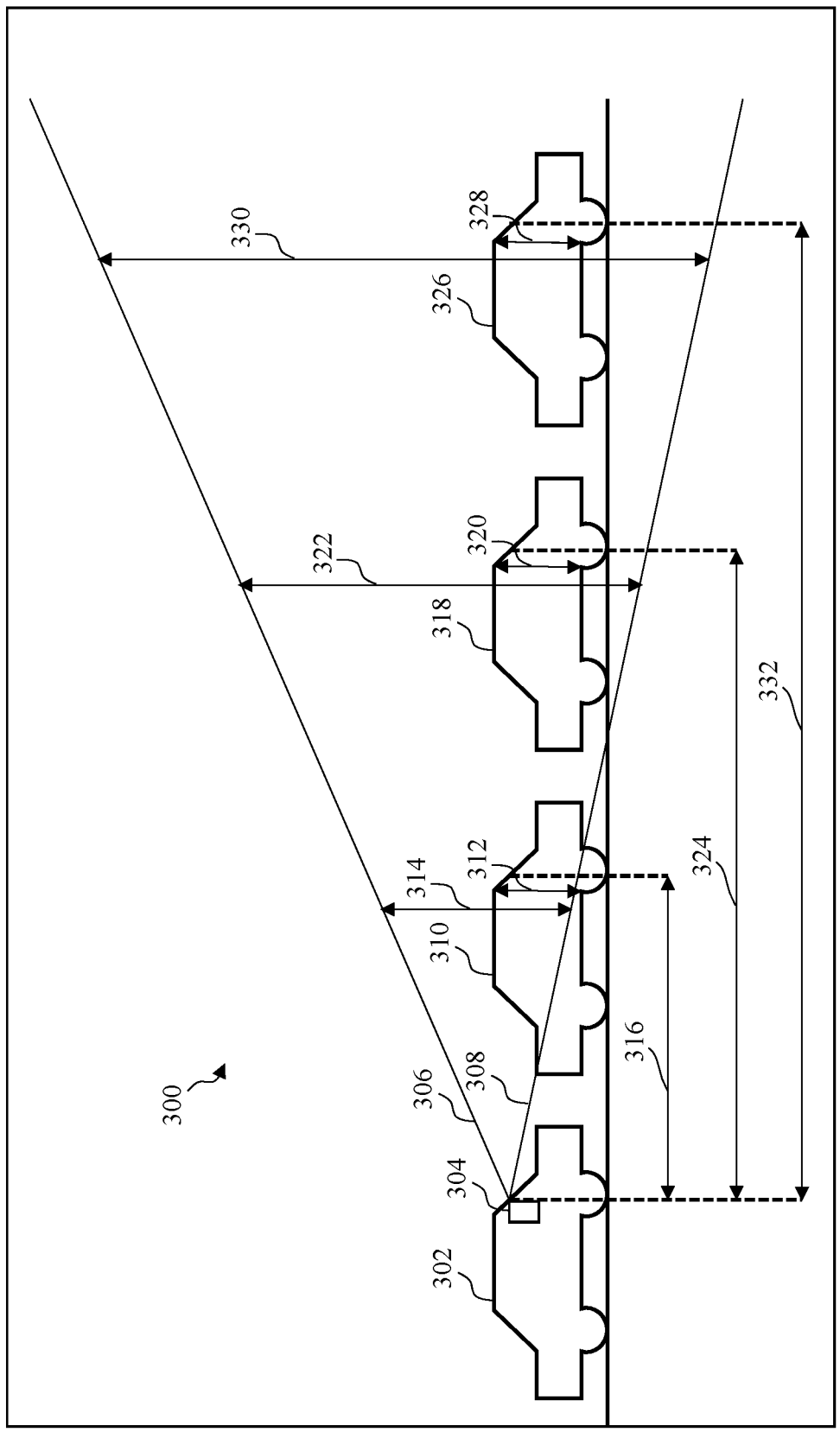
FIG. 3 illustrates the relationship between the size of the vehicle image and the distance of the vehicle from the vehicle with the camera.

FIG. 3 illustrates the relationship between the image size of the vehicle in traffic and its distance from the vehicle with the smartphone camera. Vehicle 302 with the dashboard or windshield mounted smartphone 304 has a back-camera view defined by lines 306 and 308. For vehicle 310 in traffic, the ratio of the vehicle image height 312 to camera view height 314 is inversely proportional to the distance 316 of vehicle 310 from the smartphone 304. Similarly, for vehicle 318, the ratio of the vehicle image height 320 to camera view height 322 is inversely proportional to the distance 324 of vehicle 318 from the smartphone 304. Similarly, for vehicle 326, the ratio of the vehicle image height 328 to camera view height 330 is inversely proportional to the distance 332 of vehicle 326 from the smartphone 304. In general, the farther the vehicle in traffic is from the vehicle with the smartphone app, the smaller its image appears in size. This relationship may be employed in establishing the distance of the vehicle in traffic from the vehicle with the smartphone camera.

Furthermore, research shows that exhaust from nearer vehicles in traffic has a greater impact on the air quality around the vehicle with the camera. As illustrated in FIG. 3, the height of a vehicle as seen from the back camera of the smartphone mounted to the dashboard or windshield of a vehicle is inversely proportional to the distance of that vehicle in traffic. Combining these two ideas, the size of the vehicle in the image of traffic taken by the smartphone camera is linearly proportional to the impact on the air quality around the vehicle with the camera. According to one embodiment of the present invention, the traffic condition is determined as the sum of the sizes of the vehicles in traffic. For example, as illustrated in FIG. 2D, traffic condition may be determined as the sum of vehicle sizes 222, 226, and 230. According to another embodiment of the present invention, the traffic condition is determined as the weighted sum of the sizes of the vehicles detected, where the nearest vehicle is assigned the most weight and the farthest vehicle is assigned the least weight. For example, as illustrated in FIG. 2D, the size 222 of the vehicle 220 is set to a weighted size of 1 since it is just in front of the vehicle with the smartphone. Similarly, the size 226 of the vehicle 224 is set to a weighted size that is inversely proportional to its distance from the vehicle with the smartphone. Similarly, the size 230 of the vehicle 228 is set to a weighted size that is inversely proportional to its distance from the vehicle with the smartphone. The traffic condition may then be determined as the weighted sum of vehicle sizes 222, 226, and 230.

FIG. 4 is a chart 400 illustrating an example method of determining outside air acceptability state as a function of traffic condition 402 and vehicle speed 404. The traffic condition 402 may be in the range of low 406, medium 408, or high 410. According to one embodiment of the present invention, for example, the low range may be less than one, the medium range may be from one to three, and the high range may be greater than three. The vehicle speed 404 may be in the range of low 412, medium 414, or high 416. For example, the low range may be less than 10 mph (miles per hour), the medium range may be from 10 mph to 45 mph, and the high range may be greater than 45 mph. Based on the range of traffic condition 402 and vehicle speed 404, the outside air acceptability state is acceptable 420, maybe acceptable 422, or not acceptable 424. For example, for a low traffic condition 406 and medium vehicle speed 414, the outside air acceptability state is acceptable 420. Similarly, for a medium traffic condition 408 and medium vehicle speed 414, the outside air acceptability state is maybe acceptable 422. Similarly, for a high traffic condition 410 and medium vehicle speed 414, the outside air acceptability state is not acceptable 424. The above-mentioned method is only an example. Those skilled in the art would appreciate other suitable methods according to the teaching of the present invention.

Figure 5:
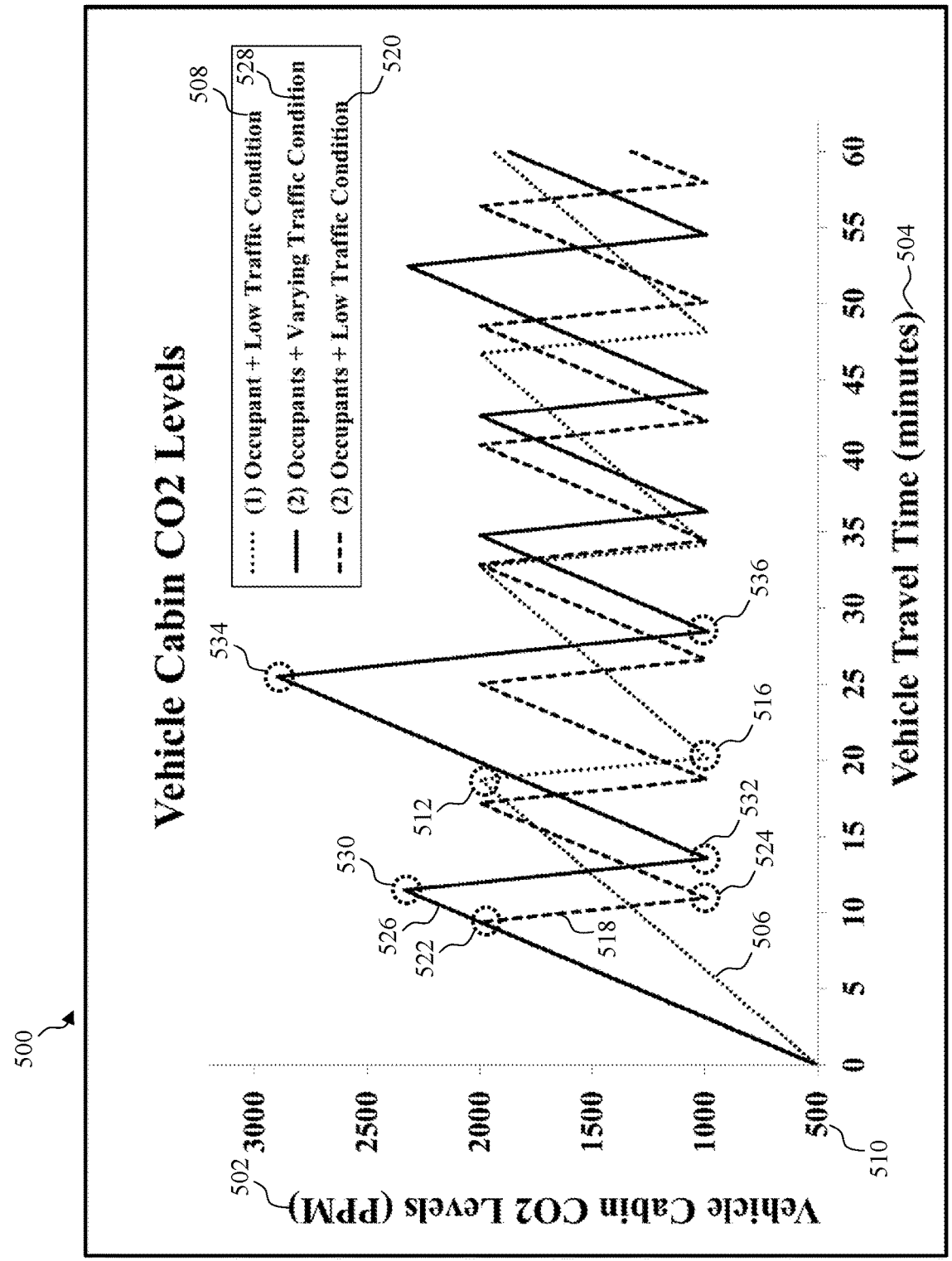
FIG. 5 illustrates the relationship between the $CO_2$ level in vehicle cabin space as a function of number of vehicle occupants and time since beginning of recirculation mode.

FIG. 5 is a graph 500 illustrating the CO2 level 502 in vehicle cabin space as a function vehicle travel time 504. In one embodiment, the CO2 concentration is calculated as follows:

CO2_(t)=CO2_(t-dt)+Vehicle_Occupants× CO2_exhalation×dt−CO2_ventilation×dt, wherein:

CO2_(t) is the CO2 concentration at any given time t,

CO2_(t-dt) is the CO2 concentration at time t-dt, dt is the time interval between two consecutive CO2 concentration readings, Vehicle_Occupants is the number of occupants in the vehicle, CO2_exhalation is the rate of exhalation of CO2 per person per minute, and CO2_ventilation is the rate of fall of CO2 concentration per minute during ventilation mode (also defined as recirculation mode=off)

When the recirculation mode is on, the air in the cabin of the vehicle is recirculated without bringing any fresh air from outside. Due to breathing, the vehicle occupants are exhaling carbon dioxide resulting in continuous rise in carbon dioxide concentration. In general, the more the number of vehicle occupants, and the longer the duration of the recirculation mode, the higher is the CO2 concentration in the cabin space of the vehicle. The CO2 concentration is preferably maintained below a desired value (about 2000-

3000 PPM) to avoid sleepiness and nausea and unsafe driving conditions. For example, in graph 500, plot 506 represents CO2 concentration in vehicle cabin space with only one occupant in low traffic condition 508. At the start of the vehicle travel, the recirculation mode is on. The plot 506 starts at 500 PPM 510 as it represents the typical CO2 levels in the vehicle cabin space before the occupant enters. The plot 506 rises gradually at a typical rate of about 80 ppm per minute per person. As the CO2 levels in the vehicle cabin space reaches 2000 PPM 512, the recirculation mode in turned off to bring in fresh air from outside to lower CO2 levels in the vehicle cabin space. Through ventilation, CO2 levels are brought down at the rate of about 800 PPM per minute to 1000 PPM 516, at which time the recirculation mode in turned on. This process is repeated throughout the vehicle travel time. In another example, plot 518 represents CO2 concentration in vehicle cabin space with two occupants in low traffic condition 520. At the start of the vehicle travel, the recirculation mode is on. The plot 518 starts at 500 PPM 510. Since they are two occupants, the plot 518 rises at twice the rate compared to plot 506. As the CO2 levels in the vehicle cabin space reaches 2000 PPM 522, the recirculation mode in turned off to bring in fresh air from outside to lower CO2 levels in the vehicle cabin space. Through ventilation, CO2 levels are brought down to 1000 PPM 524, at which time the recirculation mode in turned on. This process is repeated throughout the vehicle travel time. In yet another example, plot 526 represents CO2 concentration in vehicle cabin space with two occupants in varying (low to high) traffic conditions 528. At the start of the vehicle travel, the recirculation mode is on. The plot 526 starts at 500 PPM 510. Since they are two occupants, the plot 526 rises at the same rate as plot 518. As the CO2 levels in the vehicle cabin space reaches 2000 PPM, the outside air acceptability is found to be not acceptable and CO2 levels are allowed to continue rising. However, at about 2400 PPM 530, the outside air acceptability state is deemed acceptable, and through ventilation, CO2 levels are brought down to 1000 PPM 532. When CO2 levels have reached 1000 PPM, recirculation mode is turned on. Once again, CO2 levels reach 2000 PPM, and the outside air acceptability is found to be not acceptable, so CO2 levels are allowed to keep rising. However, at 3000 PPM 534, even though the outside air acceptability still continues to remain not acceptable, the cabin air must be ventilated because of excessive CO2 levels, and CO2 levels are brought down to 1000 PPM 536. This process is repeated throughout the vehicle travel time with varying traffic conditions.

Figure 6:
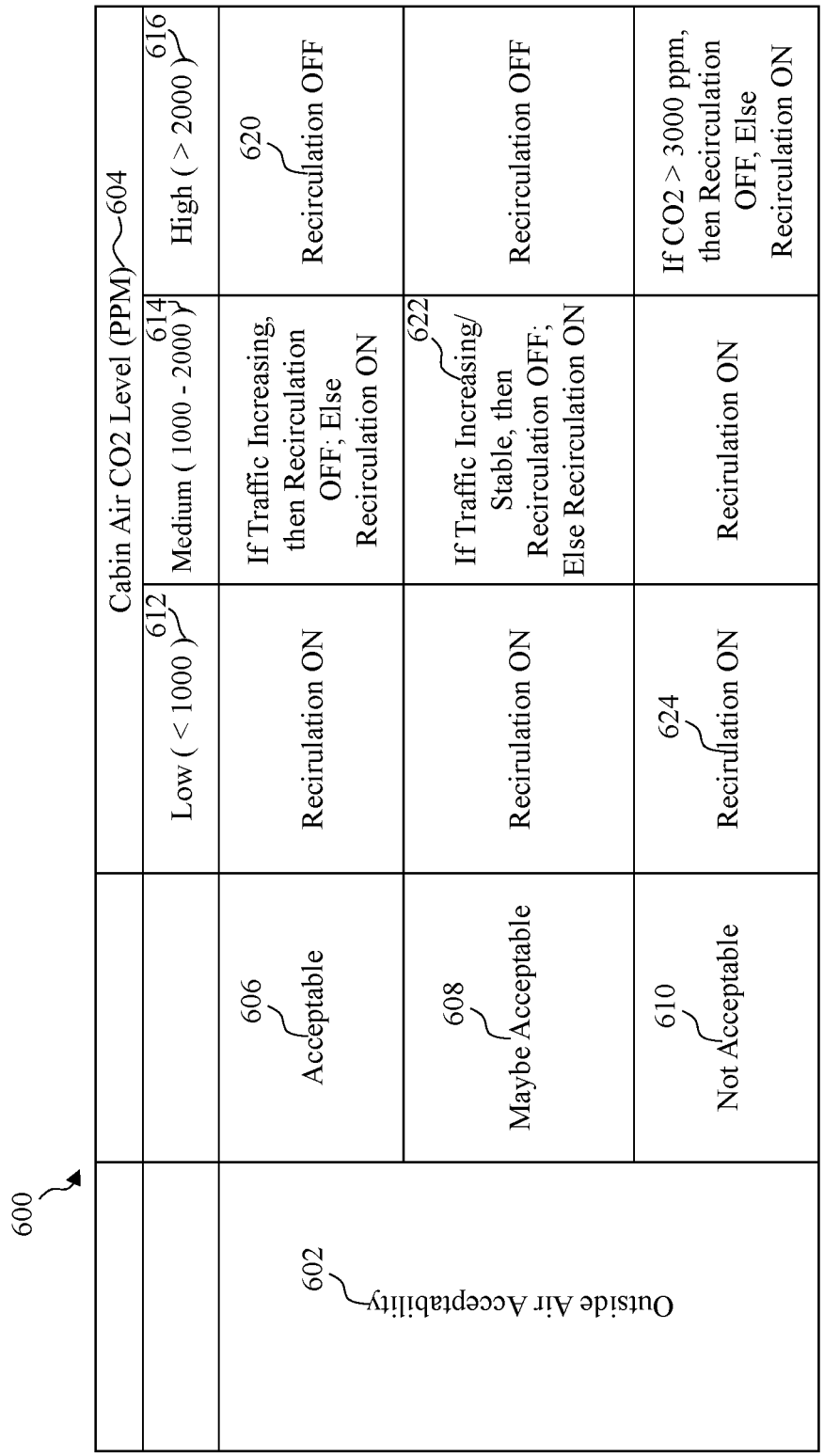
FIG. 6 is a chart illustrating an example method of determining recirculation mode as a function of outside air acceptability and cabin air $CO_2$ levels.

FIG. 6 is a chart 600 illustrating an example method of determining the final recirculation decision as a function of outside air acceptability state 602 and cabin air CO2 levels 604. The outside air acceptability state 602 may be in the range of acceptable 606, maybe acceptable 608, or not acceptable 610. The cabin air CO2 level 604 may be in the range of low 612, medium 614, or high 616. According to one embodiment of the present invention, for example, the low range may be less than 1000 ppm (part per million), the medium range may be from 1000 ppm to 2000 ppm, and the high range may be greater than 2000 ppm. Based on the range of outside air acceptability 602 and cabin air CO2 level 604, the final recirculation decision is recirculation on 620, dependent on other variables 622, or recirculation off 624. For example, for acceptable outside air acceptability 606 and high cabin air CO2 level 616, the final recirculation decision is recirculation on 620. Similarly, for maybe acceptable outside air acceptability 608 and medium cabin air CO2 level 614, the final recirculation decision is dependent on other variables, where if the traffic condition is increasing or stable, then recirculation is off, else recirculation is on 622. Similarly, for not acceptable outside air acceptability 610 and low cabin air CO2 level 612, the final recirculation decision is recirculation on 624. The above-mentioned method is only an example. Those skilled in the art would appreciate other suitable methods according to the teaching of the present invention.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A method for determining and communicating recirculation mode in a vehicle for improving cabin air quality in the vehicle, the method comprising acts of:
    determining a number of occupants inside the vehicle;
    capturing an image or video of traffic ahead of the vehicle;
    analyzing the image or video of the traffic to detect a presence of vehicles;
    determining traffic condition as a weighted sum of the sizes of the vehicles detected in the traffic;
    acquiring a vehicle speed of the vehicle;
    determining outside air acceptability state based on the traffic condition and the vehicle speed;
    determining carbon dioxide ($CO_2$) levels in a vehicle cabin space based on the number of occupants present;
    determining a final recirculation mode based on the outside air acceptability state and the $CO_2$ levels in the vehicle cabin space; and
    communicating the final recirculation mode to a vehicle controller or at least one occupant of the occupants.

2. The method according to claim 1, wherein the act of determining the number of occupants inside the vehicle comprises of manually entering the number of occupants into a smartphone app.

3. The method according to claim 1, wherein the act of determining the number of occupants inside the vehicle comprises of using a front camera of a dashboard or windshield mounted smartphone to capture the number of occupants present in the vehicle.

4. The method according to claim 1, wherein the act of determining the number of occupants inside the vehicle comprises of the vehicle detecting the number of vehicle occupants present using pressure sensors located under each seat of the vehicle and sending detected values from the pressure sensors to the vehicle controller.

5. The method according to claim 1, wherein the act of capturing the image or video of the traffic ahead of the vehicle comprises of using a back camera of a smartphone mounted on a dashboard or a windshield of the vehicle that is capturing the image or video of the traffic ahead of the vehicle.

6. The method according to claim 1, wherein the act of capturing the image or video of the traffic ahead of the vehicle comprises of using a camera or cameras of the vehicle that is capturing the image or video of the traffic ahead of the vehicle.

7. The method according to claim 1, wherein the act of capturing the image or video of the traffic ahead of the vehicle comprises of using a webcam mounted on a dashboard or a windshield of the vehicle that is capturing the image or video of the traffic ahead of the vehicle.

8. The method according to claim 1, wherein the act of analyzing the image or video of the traffic to detect the presence of vehicles comprises of a machine learning model employed real-time conducting an analysis of the image or the video.

9. The method according to claim 1, wherein the act of determining the traffic condition as the weighted sum of the sizes of the vehicles detected in the traffic comprises of assigning weights to the sizes of the vehicles, where the nearest vehicle is assigned the most weight and the farthest vehicle is assigned the least weight.

10. The method according to claim 9, wherein the act of assigning weights to the sizes of the vehicles comprises of assigning a weight of 1 to the size of the vehicle immediately ahead of the vehicle that is capturing the image or video of the traffic ahead of the vehicle.

11. The method according to claim 1, wherein the act of acquiring the vehicle speed comprises of using a smartphone app determining the vehicle speed by using a smartphone location feature.

12. The method according to claim 1, wherein the act of acquiring the vehicle speed comprises of using the vehicle controller.

13. The method according to claim 1, wherein the act of communicating the final recirculation mode to the vehicle controller or the at least one occupant comprises of communicating the final recirculation mode using a smartphone via Bluetooth.

14. The method according to claim 1, wherein the act of communicating the final recirculation mode to the at least one occupant comprises of communicating the final recirculation mode with an audio announcement of the recirculation mode using a smartphone.

15. The method according to claim 1, wherein the act of communicating the final recirculation mode to the occupant comprises of communicating the final recirculation mode by displaying the recirculation mode on a screen of the smartphone.

16. A product comprising a non-transitory medium storing a smartphone app for determining and communicating recirculation mode in a vehicle for improving cabin air quality in the vehicle, where a smartphone is mounted to a dashboard or a windshield of the vehicle, where a back camera of the smartphone faces traffic ahead of the vehicle, wherein when executed by the smartphone, the smartphone app performing acts of:
  acquiring a number of occupants inside the vehicle, wherein at least one occupant of the occupants manually enters the number of occupants into the smartphone app;
  capturing an image or video of traffic ahead of the vehicle using the back camera of the smartphone;
  analyzing the image or video of the traffic to detect a presence of vehicles;
  determining traffic condition as a weighted sum of the sizes of the vehicles detected in the traffic;
  acquiring a vehicle speed of the vehicle using a smartphone location feature;
  determining outside air acceptability state based on the traffic condition and the vehicle speed;
  determining carbon dioxide ($CO_2$) levels in a vehicle cabin space based on the number of the occupants present;
  determining a final recirculation mode based on the outside air acceptability state and the $CO_2$ levels in the vehicle cabin space; and
  communicating the final recirculation mode to a vehicle controller or at least one occupant of the occupants.

17. The method according to claim 16, wherein the act of analyzing the image or video of the traffic to detect the presence of vehicles comprises of a machine learning model employed real-time conducting the analysis of the image or the video.

18. The method according to claim 16, wherein the act of determining the traffic condition as the weighted sum of the sizes of the vehicles detected in the traffic comprises of assigning a weight of 1 to the size of the vehicle immediately ahead of the vehicle that is capturing the image or video of the traffic.

19. The method according to claim 16, wherein the act of communicating the final recirculation mode to the vehicle controller or the at least one occupant comprises of communicating the final recirculation mode using Bluetooth communication.

20. A controller for determining and communicating recirculation mode in a vehicle for improving cabin air quality in the vehicle, the controller is configured to perform acts of:
  determining a number of occupants inside the vehicle;
  capturing an image or video of traffic ahead of the vehicle;
  analyzing the image or video of the traffic to detect a presence of vehicles;
  determining traffic condition as a weighted sum of the sizes of the vehicles detected in the traffic;
  acquiring a vehicle speed of the vehicle;
  determining outside air acceptability state based on the traffic condition and the vehicle speed;
  determining carbon dioxide ($CO_2$) levels in a vehicle cabin space based on the number of occupants present;
  determining a final recirculation mode based on the outside air acceptability state and the $CO_2$ levels in the vehicle cabin space; and
  communicating the final recirculation mode to the vehicle or at least one occupant of the occupants.

* * * * *